No. 820,175.
PATENTED MAY 8, 1906.
B. S. BOWMAN.
SAFETY CAR TRUCK AXLE.
APPLICATION FILED JUNE 21, 1905.
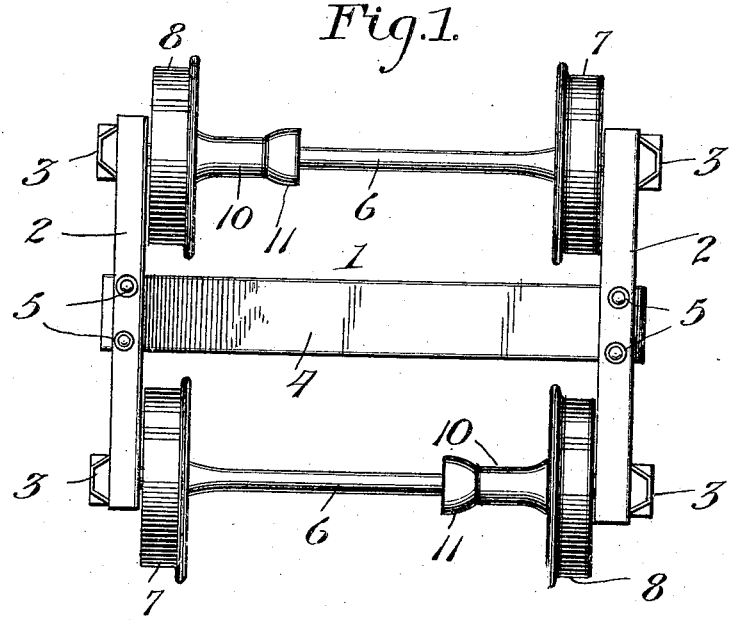
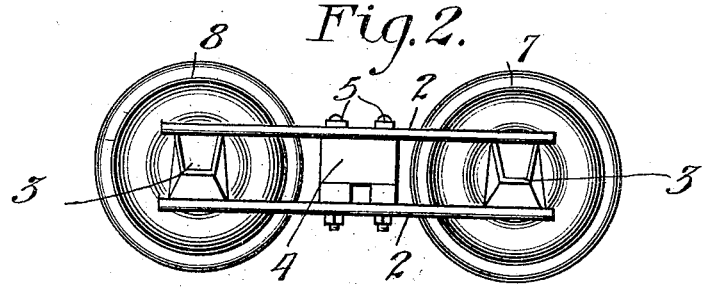
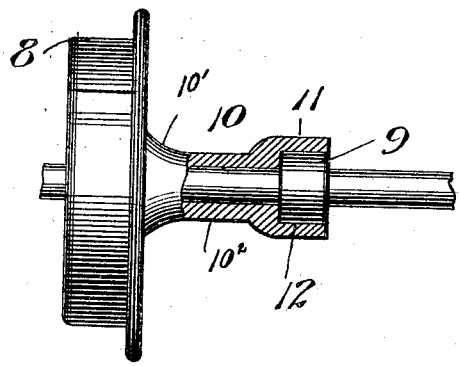
Witnesses
Phil. E. Barnes
F. S. Elmore
Inventor
Benton S. Bowman
By Victor J. Evans
Attorney

UNITED STATES PATENT OFFICE.

BENTON S. BOWMAN, OF MILLERSBURG, PENNSYLVANIA, ASSIGNOR OF ONE-HALF TO SAMUEL S. JOHNSON, OF MILLERSBURG, PENNSYLVANIA.

SAFETY CAR-TRUCK AXLE.

No. 820,175.

Specification of Letters Patent.

Patented May 8, 1906.

Application filed June 21, 1905. Serial No. 266,304.

*To all whom it may concern:*

Be it known that I, BENTON S. BOWMAN, a citizen of the United States of America, residing at Millersburg, in the county of Dauphin and State of Pennsylvania, have invented new and useful Improvements in Safety Car-Truck Axles, of which the following is a specification.

My invention has relation to improvements in car-axles and wheels therefor; and it consists in the construction and arrangement of parts, as will be hereinafter described, and particularly pointed out in the claim.

In the accompanying drawings, Figure 1 is a top plan view of a truck embodying the invention. Fig. 2 is an end view of the same. Fig. 3 is a detail view, partly in section, of the movable wheel and a portion of the axle.

Referring to the drawings, 1 designates the truck-frame, comprising frame members 2, which support the journal-boxes 3, and a transverse bar or bolster 4, having its ends seated in the frame members and secured thereto by fastening members or bolts 5, there being journaled for rotation in the boxes 3 and at opposite sides of the beam 4 axles 6, each equipped with a pair of wheels 7 and 8, these parts, except as hereinafter explained, being all of the usual or any appropriate construction and material.

The axles 6, which are identical in construction, are each provided at a point suitably remote from one of its ends with a fixed head or collar 9, while the adjacent wheel 8, which is free for rotation upon the axle, is provided with a tubular hub extension 10, projecting inwardly from its inner face and terminating in an enlarged portion 11, having a socket 12 to receive said collar, the companion wheel 7 of the pair of wheels being fixed upon the axle in the usual manner. It is to be particularly observed that the wheels 8 are disposed relatively at opposite sides of the truck 1 for a purpose which will presently appear.

On the inner face of the wheel I provide the hub 10 with a bell-shaped bearing 10', which reinforces the wheel and adds strength to the same when the end of the axle rotates therein. Between the enlarged socketed portion and the bell-shaped bearing 10' is arranged a reduced portion $10^2$, in which the axle also rotates.

In practice during travel of the truck upon the rails the pairs of wheels 7 and 8 will rotate, as usual, with their axles 6. When, however, the device is rounding curves, the wheels 7 and 8 will revolve at a relatively differential speed, owing to the wheel 8 being free for rotation upon the axle 6, while the wheel 7 revolves with the latter, it being apparent that under this construction the wheels will accommodate themselves in speed to the degree of the curve, thus relieving the rails in a great measure from wear and at the same time obviating undue strains upon the axles for bending or twisting the same. The truck-frame and axles may be readily assembled or disassembled by removing the bolts 5, thus to disconnect the frame members 2.

From the foregoing it is apparent that I produce a simple inexpensive device admirably adapted for the attainment of the ends in view, it being understood that minor changes in the details herein set forth may be resorted to without departing from the spirit of the invention.

Having thus described the invention, what I claim is—

A structure of the character described comprising an axle having a solid fixed collar thereon, a wheel fixed on one end of the axle, a wheel mounted on the other end of the axle having a hub provided with a bell-shaped bearing formed on its inner face, an enlarged portion on the other end of the hub having a socket therein, a reduced portion between the enlarged and bell-shaped portions, the collar of the axle being rotatably mounted in the socket, the outer end of the axle being also rotatably mounted in the reduced portion of the hub and said bell-shaped bearing, substantially as specified.

In testimony whereof I affix my signature in presence of two witnesses.

BENTON S. BOWMAN.

Witnesses:
E. HALLES CROLL,
D. L. BRANDT.